United States Patent
Chandra et al.

(10) Patent No.: US 9,396,341 B1
(45) Date of Patent: Jul. 19, 2016

(54) DATA ENCRYPTION IN A DE-DUPLICATING STORAGE IN A MULTI-TENANT ENVIRONMENT

(71) Applicant: EMC Corporation, Hopkinton, MA (US)

(72) Inventors: Surendar Chandra, Sunnyvale, CA (US); Darren Sawyer, San Carlos, CA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/675,252

(22) Filed: Mar. 31, 2015

(51) Int. Cl.
*G06F 12/14* (2006.01)
*G06F 21/60* (2013.01)

(52) U.S. Cl.
CPC .................................. *G06F 21/602* (2013.01)

(58) Field of Classification Search
CPC ............................. G06F 21/602; H04L 9/14
USPC ........................ 713/167, 193; 726/6
See application file for complete search history.

(56) References Cited

U.S. PATENT DOCUMENTS

| | | | | |
|---|---|---|---|---|
| 8,117,464 B1* | 2/2012 | Kogelnik | H04L 63/0428 | 380/284 |
| 8,239,543 B1* | 8/2012 | Ramany | G06F 3/0604 | 709/227 |
| 8,495,392 B1* | 7/2013 | Bardale | G06F 21/62 | 711/117 |
| 8,577,850 B1* | 11/2013 | Genda | G06F 3/0641 | 707/692 |
| 8,700,578 B1* | 4/2014 | Varadan | G06F 17/3015 | 707/692 |
| 8,836,548 B1* | 9/2014 | Chandra | H03M 7/607 | 341/50 |
| 8,930,307 B2* | 1/2015 | Colgrove | H03M 7/607 | 707/610 |
| 9,037,856 B2* | 5/2015 | Bestler | H04L 9/0863 | 713/167 |
| 9,195,851 B1* | 11/2015 | Chandra | G06F 21/6218 | 713/167 |
| 9,251,160 B1* | 2/2016 | Wartnick | G06F 17/30156 | 713/167 |
| 2009/0271485 A1* | 10/2009 | Sawyer | G06F 3/061 | 709/206 |
| 2011/0271010 A1* | 11/2011 | Kenchammana | G06F 3/06 | 709/244 |
| 2012/0216052 A1* | 8/2012 | Dunn | G06F 21/78 | 713/193 |
| 2013/0086006 A1* | 4/2013 | Colgrove | G06F 3/0688 | 707/692 |
| 2013/0097380 A1* | 4/2013 | Colgrove | G06F 17/30159 | 711/118 |
| 2013/0242054 A1* | 9/2013 | Chiu | G06T 17/00 | 348/46 |
| 2013/0275656 A1* | 10/2013 | Talagala | G06F 12/0246 | 711/103 |
| 2013/0297884 A1* | 11/2013 | Hyde, II | G06F 12/0891 | 711/135 |
| 2014/0214775 A1* | 7/2014 | Shi | G06F 17/30156 | 707/692 |
| 2014/0215590 A1* | 7/2014 | Brand | H04L 67/1097 | 726/6 |
| 2015/0142755 A1* | 5/2015 | Kishi | G06F 12/04 | 707/692 |

\* cited by examiner

*Primary Examiner* — Haresh N Patel
(74) *Attorney, Agent, or Firm* — Stanford Tomita LLP

(57) ABSTRACT

The present invention addresses encryption systems and methods in the de-duplication of data in a multi-tenant environment. The system provides isolation between tenants' stored data and the storage system. The tenants' data is broken down into many smaller raw data items. Fingerprints are generated for the raw data and compared to fingerprints of raw data previously stored on the storage system. The raw data and fingerprint are encrypted with a single use key (SUK) by the storage system. The SUK encrypted fingerprint is wrapped with a storage system key and stored with other fingerprints. The SUK encrypted fingerprint is also returned to the tenants and wrapped with a tenant key. The use of tenant key wraps allows the tenant data to be protected and confidential to each tenant but allows the raw data to be shared by all tenants.

17 Claims, 12 Drawing Sheets

DATA ENCRYPTION IN A DE-DUPLICATING STORAGE IN A MULTI-TENANT ENVIRONMENT

FIELD

The present invention relates generally to data encryption and specifically to security systems and methods in de-duplicating multi-tenant environments.

BACKGROUND

Companies are increasingly turning to cloud storage for their data storage needs. Storing data in the cloud helps companies to lower expenses by, for example, reducing the need to maintain physical servers and other hardware resources. Similarly, cloud storage vendors are continuously seeking new ways to reduce their costs. Eliminating redundant data is one way a cloud storage vendor can reduce costs. Eliminating redundant data can significantly shrink storage requirements and improve bandwidth efficiency. Removing redundant data lowers storage costs as fewer disks are needed. Removing redundant data also helps to conserve electricity to power and cool the disks or tape drives.

Deduplication is a process for removing redundant data. In particular, if two objects are duplicates of each other, then only one of the objects needs to be stored. Thus, the amount of data to be stored can be reduced. Eliminating redundant data in a cloud environment, however, is difficult because the data is often encrypted by the customer of the cloud storage vendor for security purposes. Thus, a vendor's cloud storage system may include many redundant data objects across its customers, but which appear to be different because of the encryption. It can be desirable to reduce the amount of redundant data that is stored in order to reduce the computing costs for the vendor. Such cost savings may be passed to the customers of the cloud storage vendor.

Storage systems such as EMC Data Domain rely on de-duplication to achieve significant data compression. In a multi-tenant environment, backups from different tenants are stored in the same storage system. Tenants do not mutually trust each other and do not want other tenants to read their data. What is needed is an encryption system that allows storage systems to process de-duplicated data without compromising the security of the tenant data while maintaining security between tenants who share the stored de-duplicated data.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
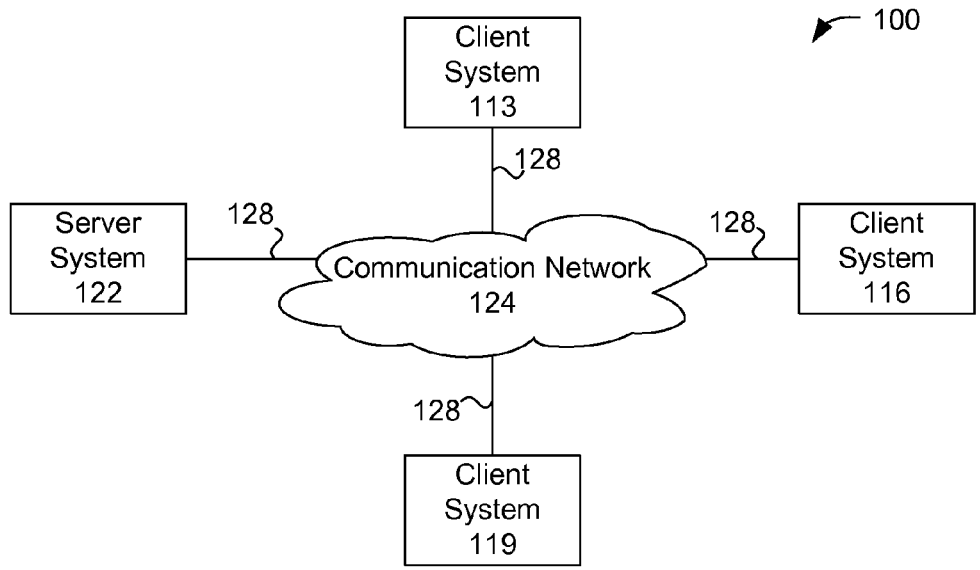
FIG. 1 shows a block diagram of a client-server system and network in which an embodiment of the system may be implemented.

A detailed description of one or more embodiments is provided below along with accompanying figures that illustrate the principles of the invention. While the invention is described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the present invention is not unnecessarily obscured.

It should be noted that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device.

For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information.

Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the system have been described using a client-server environment, it should be apparent that the system may also be embodied in a stand-alone computer system. Aspects of the system may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Figure 2:
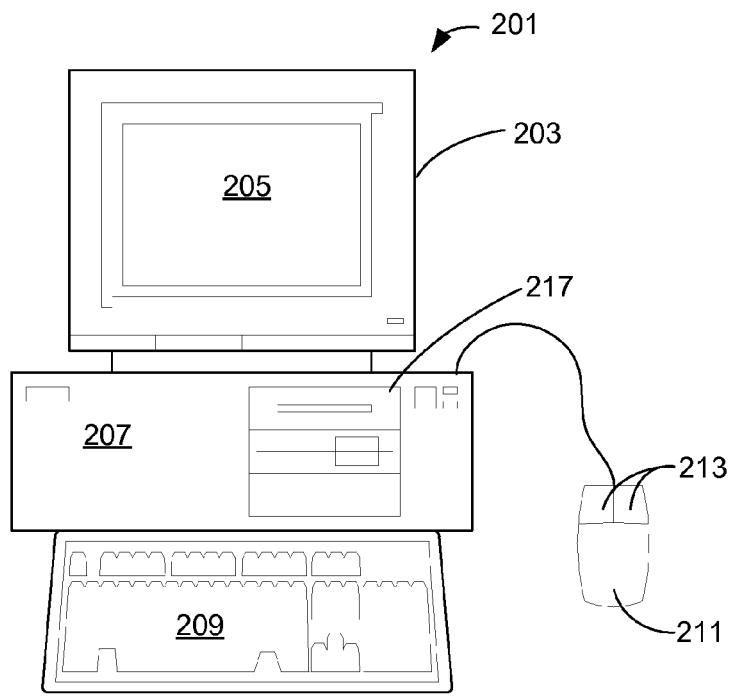
FIG. 2 shows a more detailed diagram of an example of a client or computer which may be used in an embodiment of the system.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present system may be stored or reside in RAM or cache memory, or on a mass storage device. The source code of the software may also be stored or reside on a mass storage device (e.g., hard disk, magnetic disk, tape, or CD-ROM). As a further example, code may be transmitted via wires, radio waves, or through a network such as the Internet.

Figure 3:
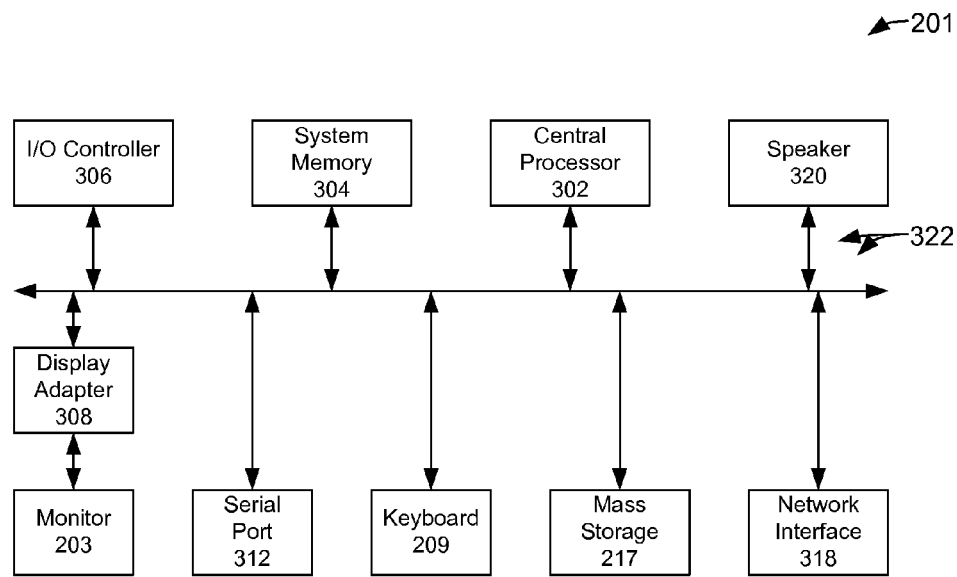
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or any other appropriate programming language). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems (e.g., Windows NT, Windows 2000, Windows XP, Windows XP x64 Edition, Windows Vista, Windows 7, Windows CE, Windows Mobile, Windows 8), Linux, HP-UX, TRU64, UNIX, Sun OS, Solaris SPARC and x64, Mac OS X, Alpha OS, AIX, IRIX32, or IRIX64. Other operating systems may also or instead be used. Microsoft Windows is a trademark of Microsoft Corporation.

Furthermore, the computer may be connected to a network and may interface to other computers using this network. The network may be an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

Figure 4:
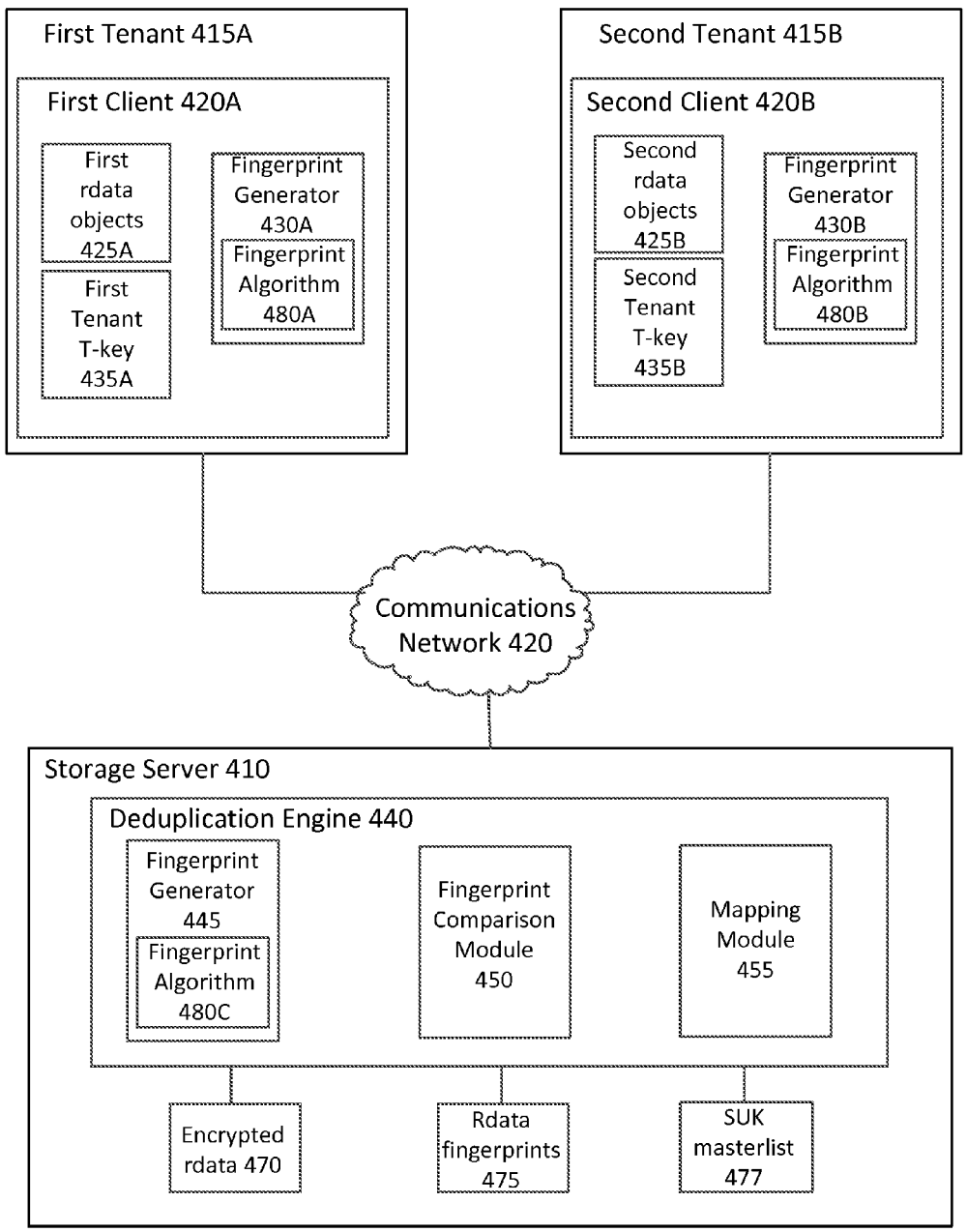
FIG. 4 shows an overall architecture of a system for deduplicating rdata objects in a specific embodiment.

FIG. 4 shows an overall architecture of a system for deduplicating encrypted data objects in a cloud computing environment. As shown in FIG. 4, there is a cloud storage server system 410 provided by a cloud services provider. The cloud services provider has tenants such as first tenant 415A and second tenant 415B, respectively, that access, via a communication network 420, services (e.g., cloud storage services) provided by the cloud services provider.

It should be appreciated, however, that the deduplication techniques described in this patent application can be applied to other object-based storage architectures. Further, in other specific embodiments, aspects of the techniques can be applied to storage architectures such as file systems which manage data as a file hierarchy and block storage which manage data as blocks within sectors and tracks.

Data stored in the cloud may be generated by the client tenants, which use the cloud storage as extended retention for backups. Cloud storage providers can benefit significantly if the data objects stored by their customer tenants can be deduplicated.

In a specific embodiment, multiple clients of a tenant can store backup data into a cloud storage system. The tenants and the cloud storage provider implement methods as described herein to deduplicate encrypted raw data (rdata) objects across the entire cloud storage system. A result can include the deduplication of all backup rdata shared by the tenants while maintaining security for the tenant data (tdata) that privately belongs to each of the multiple tenants.

Referring now to FIG. 4, there is a first client 420A that belongs to the first tenant 415A, and a second client 420B that belongs to the second tenant 415B that is different from the first tenant 415A. For example, the tenants can be separate and distinct organizations or companies (e.g., Coca Cola and Pepsi). Each tenant may have their own network domain that is different from the network domain of another tenant. The client can be a general purpose computer with hardware and software such as shown in FIGS. 2-3 and described above. For example, the client may include a processor, memory, and storage. The server or cloud storage server system includes components similar to the components shown in FIG. 3 and described above. For example, the server may include memory, applications, and storage. The communication network is as shown in FIG. 1 and described above.

The tenants each have tdata that make up of different sets of raw data objects. The tdata can be confidential and private to the each of tenants while the rdata which can be much smaller can be accessible to all tenants and the storage system. However, the rdata is encrypted to prevent non-storage system entities from access to the rdata. In the illustrated example, the first tenant 415A has a first client 420A that includes a first tdata made up of a first set of rdata objects 425A to be encrypted and backed up to the cloud storage server, a fingerprint generator 430A, and a first tenant encryption T-Key 435A. Similarly, the second tenant 415B has a second client 415B that includes a second tdata made up of a set of rdata objects 425B to be encrypted and backed up to the cloud storage server, a fingerprint generator 430B, and a second tenant encryption T-Key 435B.

The tdata can be broken into many smaller rdata object that may be referred to as a fixed or variable sized chunk or block. An rdata object may be include a small portion of a file. In particular tdata such as a file, image, or disk image may be divided into a series, sequence, or any number of rdata objects or chunks. An rdata object or chunk can be a portion of any type of public or private customer-specific rdata such as: operating system or application software, public and private documents, research and development projects, financial results, and so forth.

The fingerprint generator is responsible for generating a fingerprint of an rdata object. For example, fingerprint generator 430A accepts as input an rdata object. The fingerprint generator applies a fingerprint algorithm or function 480A to output a fingerprint of the rdata object. The fingerprinting can map an arbitrary rdata object to a shorter bit string, e.g., its fingerprint, that uniquely identifies the original rdata object. A fingerprint function is a type of hash function that can be used to uniquely identify a block of rdata. The fingerprint generator may apply any competent fingerprinting algorithm. One example of a fingerprinting algorithm that may be applied is the Rabin algorithm or Rabin-Karp algorithm, or other similar method.

In a specific embodiment, the rdata objects 425A, 425B are transmitted from the tenants 415A, 415B through the network 420 for backup to the cloud storage system 410. The tenants can keep records of the fingerprints that were sent to the storage system 410. At the storage system 410, the fingerprints of the rdata objects 425A, 425B are compared to the fingerprints of previously stored rdata objects stored on a fingerprint database 475 by the fingerprint comparison module 450 in the deduplication engine 410.

If the fingerprint exists in the fingerprint database 475, the rdata object is not stored. However, if the rdata fingerprint is not found, the storage system 410 can encrypt the new rdata item with a single use key (SUK) and store the encrypted rdata in the encrypted data object database 470. The rdata objects remain in an encrypted format at the storage system 410 and may not be decrypted at the server. The fingerprint is also added to the fingerprint master list of the storage system.

Figure 5:
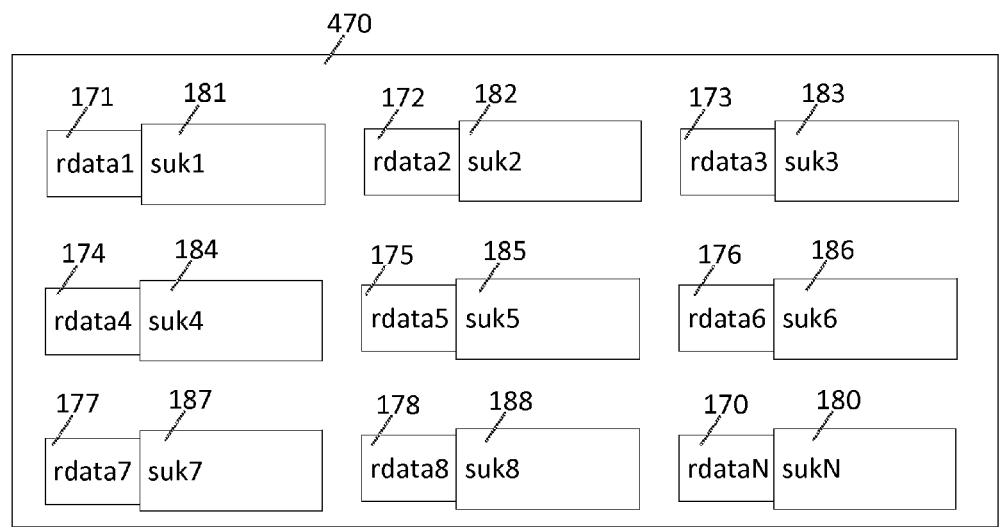
FIGS. 5 and 6 illustrates sets of SUK encrypted rdata in a storage system.

The SUKs provided by the storage system can be unique for each rdata item or the storage system can have a limited number SUKs which can be reused periodically so that multiple rdata items will be encrypted with the same SUK. With reference to FIG. 5, rdata1 171-rdataN 170 are stored on the encrypted rdata storage system 470. In this embodiment, the encrypted rdata storage 470 is configured to provide an unlimited number of SUKs. Thus, a unique SUK 181, 182 . . . -180 can be cryptographically generated for each of the rdata items 171-170. In this embodiment, the encrypted rdata storage system 470 can continue to generate unique SUKs for each additional rdata that is stored.

Figure 6:
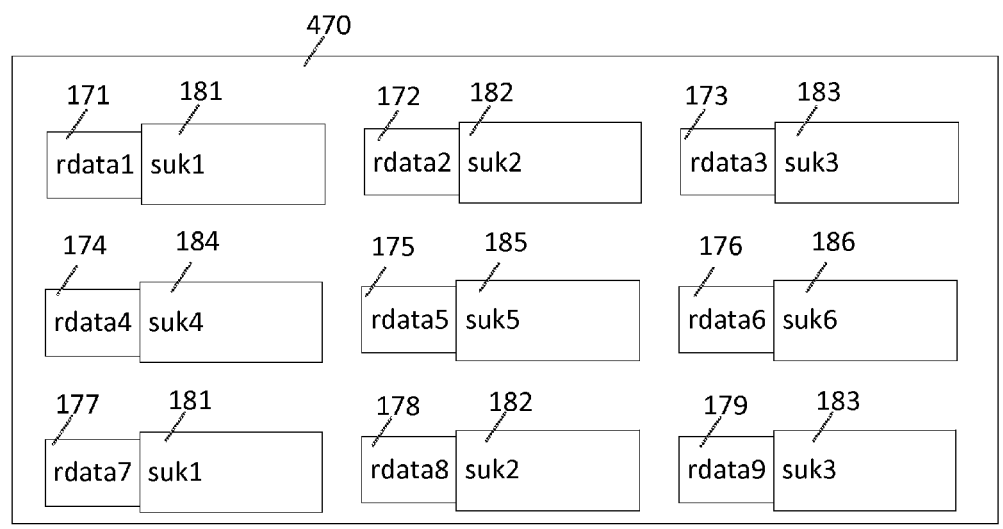

In other embodiments the encrypted rdata storage system 470 can generate a limited or fixed number of SUKs. In the example illustrated in FIG. 6, a total of 6 SUKs 181-SUK6 186 are used to encrypt the stored rdata. SUK1 171-SUK6 176 are used to encrypt rdata1 171-rdata6 176 and SUK1 181-SUK3 183 have been reused to also encrypt rdata7 177-rdata9 179 respectively. Because there are a limited number of SUKs available and the SUKs are reused, there are fewer SUKs to record and maintain in a master list by the deduplication server.

Each rdata item can remain encrypted with the unique SUK throughout the life of the rdata. The rdata security is improved with an infinite number of SUKs. However, the need to keep track of an unlimited number of SUKs can require a substantial amount of processor resources. The rdata security can also be very high if the system provides a unique SUK for each rdata item. However, it can also take a substantial amount of processing power of the storage system to keep track of large quantities of unique SUKs. Conversely, rdata security can be decreased if a fix number of SUKs or fewer SUKs are used. Fewer SUKs can potentially increase the security vulnerability window of the rdata since fewer SUKs need to be compromised to access more rdata. The amount of rdata security required by the tenants may be weighted against the computational demands on the storage system. Higher rdata encryption security can also result in slower storage system performance due to higher computational resource requirements. In an embodiment, multi-tenant storage system may have a sufficiently high level of rdata security for most commercial tenants when SUKs 105 can be reused for every 128 KB or more of compression region size data or 4.5 MB or more of container data.

When new rdata is encrypted and stored, the storage server 410 can manage and provide location information for the stored rdata in the storage system 470. The mapping module 455 is responsible for mapping or associating a fingerprint from a tenant to a stored rdata object for newly stored rdata and previously existing rdata when there is a match between a new fingerprint and a previously stored fingerprint. A mapping module 455 can keep track of the storage locations of the rdata objects and fingerprints. In an embodiment, the fingerprints can also be encrypted with the SUK of the corresponding rdata and the storage system can wrap the SUKs with a storage system key. In an embodiment, the SUK encrypted and storage system key wrapped rdata fingerprints. The fingerprint data can be stored in the rdata fingerprints storage system 475 and the SUK data can be stored on the SUK master list 477. The storage system key may only be held by the storage system and the storage system can use the storage system key to single key to get access to all SUK encrypted rdata on the storage system and perform operational processing as a the stored rdata such as garbage collection and other system maintenance functions.

Figure 7:
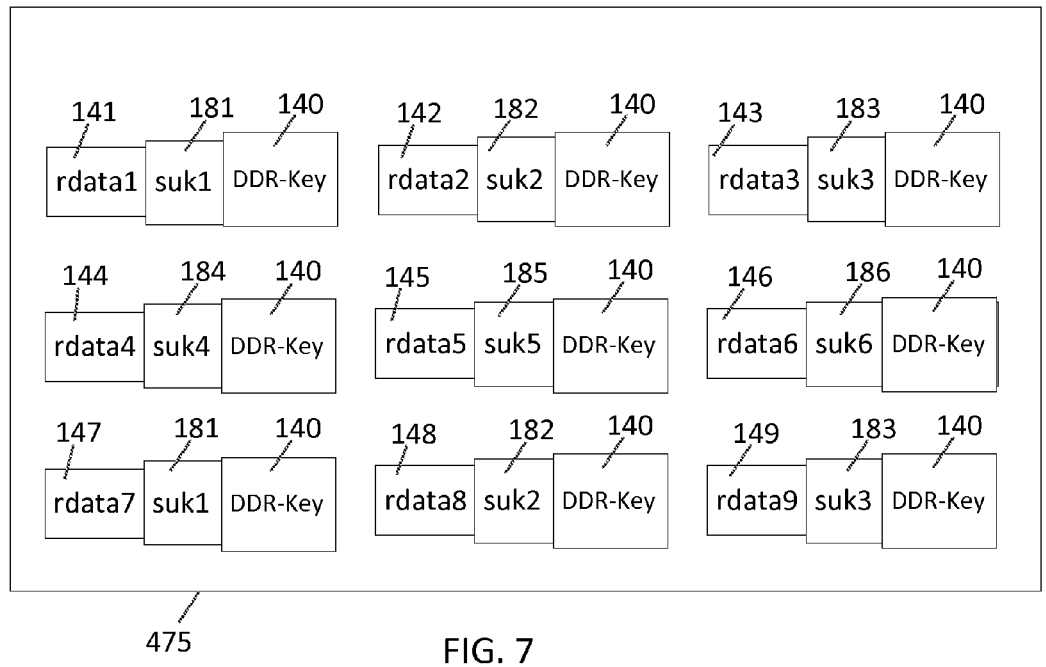
FIG. 7 illustrates sets of SUK encrypted and storage system key wrapped fingerprints.

With reference to FIG. 7 an example of a set of rdata fingerprints 141-149 stored in the fingerprint database 475 is illustrated. The rdata fingerprints 141-149 are encrypted by SUKs 181-186 as described above. The SUKs 181-186 are then wrapped with the storage system key (shown as DDR-Key 140 in FIG. 7) which is only held by the storage server and can prevent unauthorized access to the rdata fingerprints 141-149. The storage system keeps track of all the stored rdata fingerprints 141-149. Since the storage system manages both the SUKs 181-186 as well as the storage system key 140, the storage server can perform any necessary maintenance on the rdata without any need for authorization from tenants or the use of any tenant's T-Keys. Further the tenants' tdata is secure because the storage system does not access or have knowledge of the specific rdata sequences that defines any of the tenants' tdata.

Figure 8:
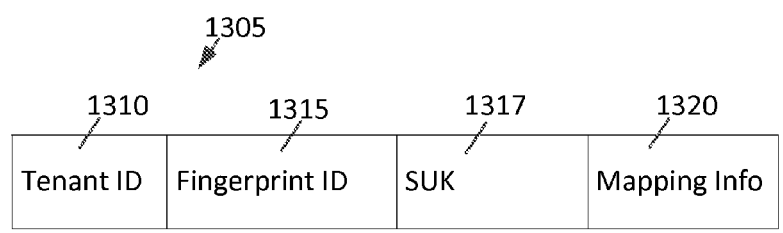
FIG. 8 illustrates an example of an entry that may be made in a table to track rdata objects in a specific embodiment.

Once the rdata has been stored, the storage server 410 can transmit the rdata fingerprint information back to the tenants so that tdata can be retrieved from the storage server 410. FIG. 8 shows an example of the fingerprint entry that can be transmitted back to the tenants. A fingerprint entry 1305 may be stored in an index, database or table to track and retrieve a tenant's encrypted rdata. The entry 1305 may include a tenant identifier 1310, a fingerprint 1315, and information 1320 that maps, references, links, points, or associates the fingerprint to a storage location of an encrypted rdata object. The entry 1305 can be encrypted with an assigned SUK 1317. FIG. 8 is merely an example of how encrypted rdata objects, tenants, and fingerprints can be tracked. For example, there can be a deduplication index. In this specific embodiment, an entry can be made in the deduplication index when an encrypted rdata object is determined to be identical to a stored rdata object and when encrypted rdata objects are not identical to any previously stored rdata objects (i.e., the fingerprint of the rdata object does not match any fingerprint of the previously stored rdata objects).

Once the rdata items that form the tdata have been mapped or stored, the storage server can also transmit the entry 1305 which can include the fingerprint ID 1315, the SUKs 1317 and mapping information 1320 for the rdata back to the tenants. The rdata sequences that form each tdata item are not stored by the storage server. Each tenant of the multi-tenant storage system can be assigned a unique encryption T-key. The SUKs used to encrypt the entry 1305 can be wrapped with the tenant's T-key. The T-Key can prevent the storage server or other tenants from identifying the rdata sequences that form the tenants' tdata.

Figure 9:
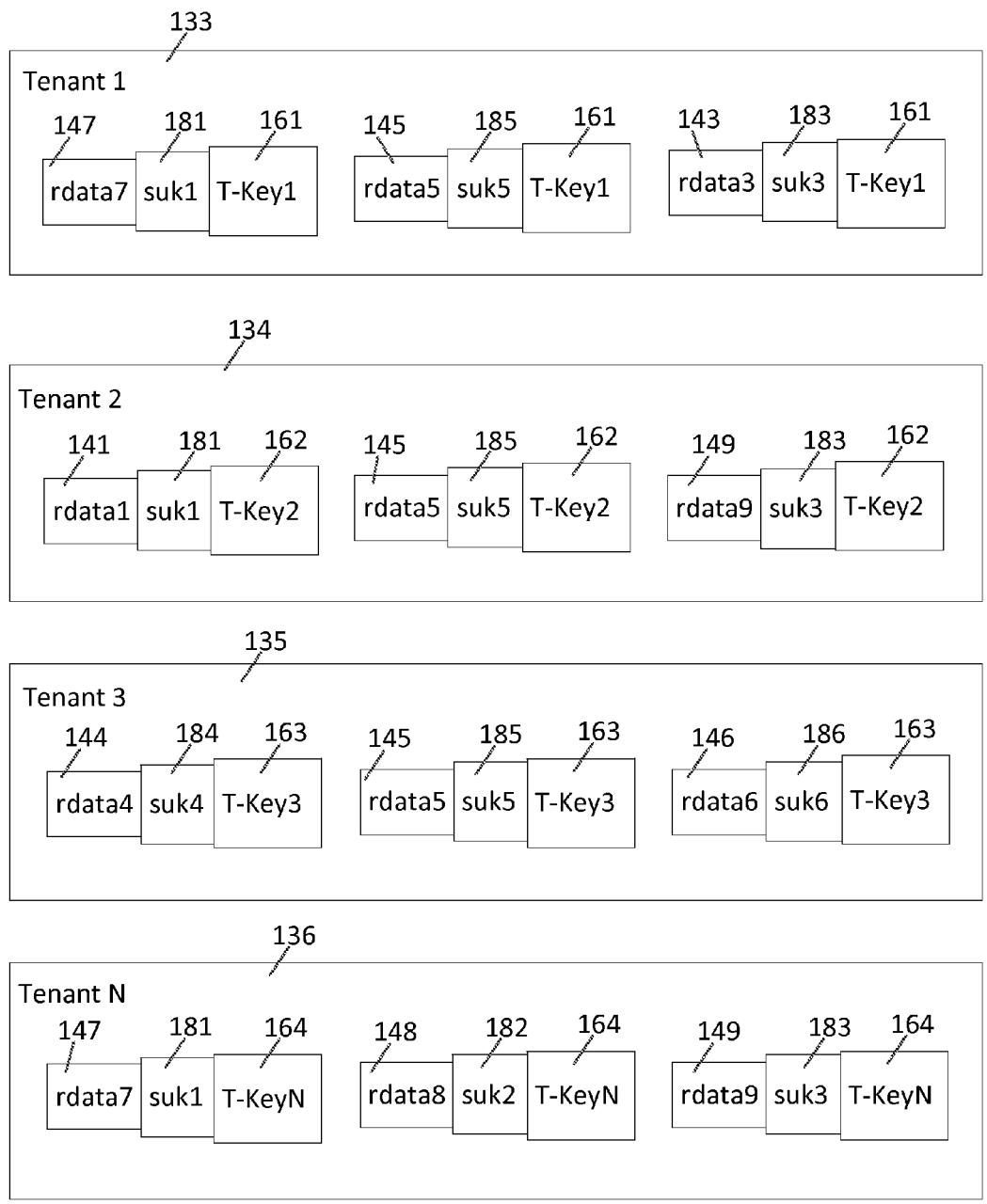
FIG. 9 illustrates sets of SUK encrypted and T-Key wrapped fingerprints representing a plurality of tenant data (tdata).

With reference to FIG. 9, examples of tdata 133-136 for a plurality of tenants is illustrated. In the illustrated example, T-Key1 161 is assigned to Tenant 1, T-Key2 162 is assigned to Tenant 2, T-Key3 163 is assigned to Tenant 3 . . . and T-KeyN 164 is assigned to Tenant N. Each tenant can use their assigned T-Keys 161-164 to wrap the SUKs used to encrypt each rdata fingerprint. Because the sequences of rdata items 111-119 for each tenant is protected by the T-Keys 161-164 of the tenants, the tdata 133-136 for each tenant is secure from other tenants since the tdata 133-136 cannot determine without the other tenant's T-Key.

As discussed, the tdata is represented by a specific sequence of rdata items. Examples of rdata sequences for tdata 133-136 are shown in Table 1 below and FIG. 9. Although each tdata 133-136 shares at least one rdata item with another tenant's tdata 133-136, the rdata sequences and therefore the cumulative tdata 133-136 for each tenant are each unique.

TABLE 1

| Tenant # | T-Key # | tdata = rdata sequence |
|---|---|---|
| Tenant 1 | T-Key1 | rdata7, rdata5, rdata3 |
| Tenant 2 | T-Key2 | rdata1, rdata5, rdata9 |
| Tenant 3 | T-Key3 | rdata4, rdata5, rdata6 |
| Tenant N | T-KeyN | rdata7, rdata8, rdata9 | in an embodiment, the disclosed T-Key and storage system key wrap constructions can utilize a class of symmetric encryption algorithms designed to encapsulate (encrypt) cryptographic key material. The key wrap algorithms can be used to protect the T-Key and storage system key while they are used by the storage system or transmitted over communications networks. The T-Key and storage system key wrap constructions can be built from standard primitives such as block ciphers and cryptographic hash functions.

The described key wrapping of the SUKs by the storage system key and T-Keys can also be FIPS 140 standard compliant means for encrypting a key with another key. The 140 series of Federal Information Processing Standards (FIPS) are U.S. Government standards that specify requirements for cryptography modules.

Figure 10:
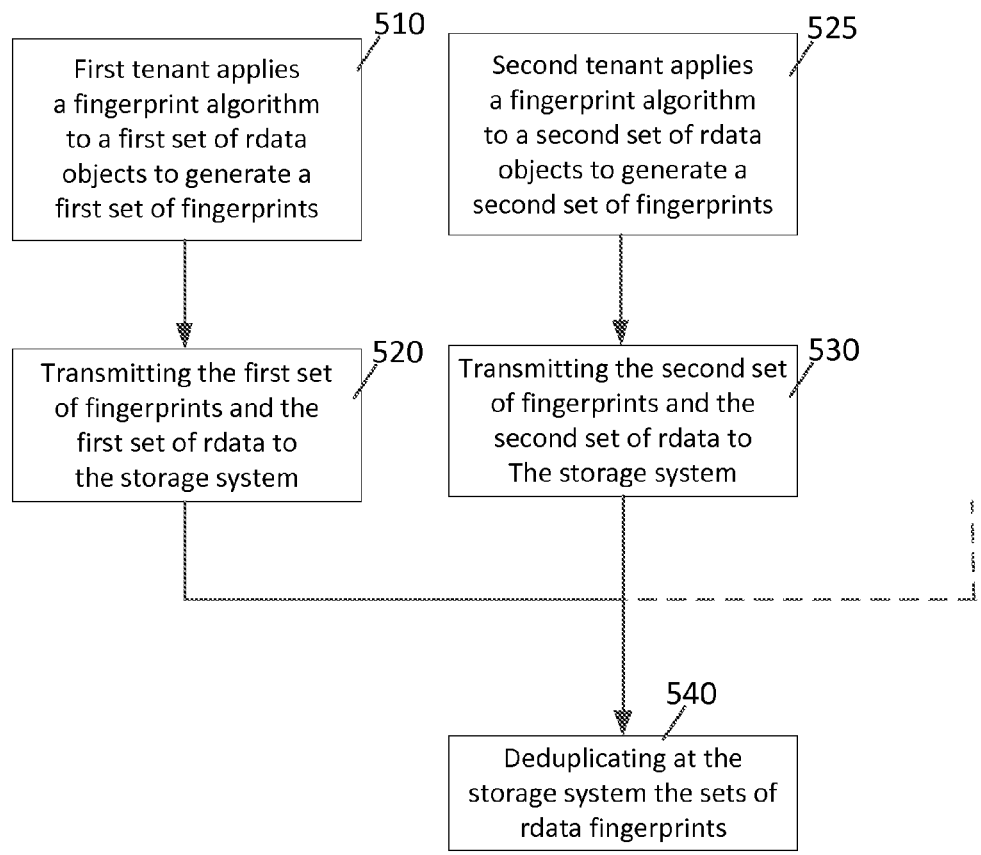
FIG. 10 illustrates a flowchart for transmitting rdata objects to the storage system for deduplication in a specific embodiment.

FIG. 10 shows a flow diagram of a specific embodiment for storing encrypted rdata objects to a cloud server storage system where they will be deduplicated. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

Figure 11:
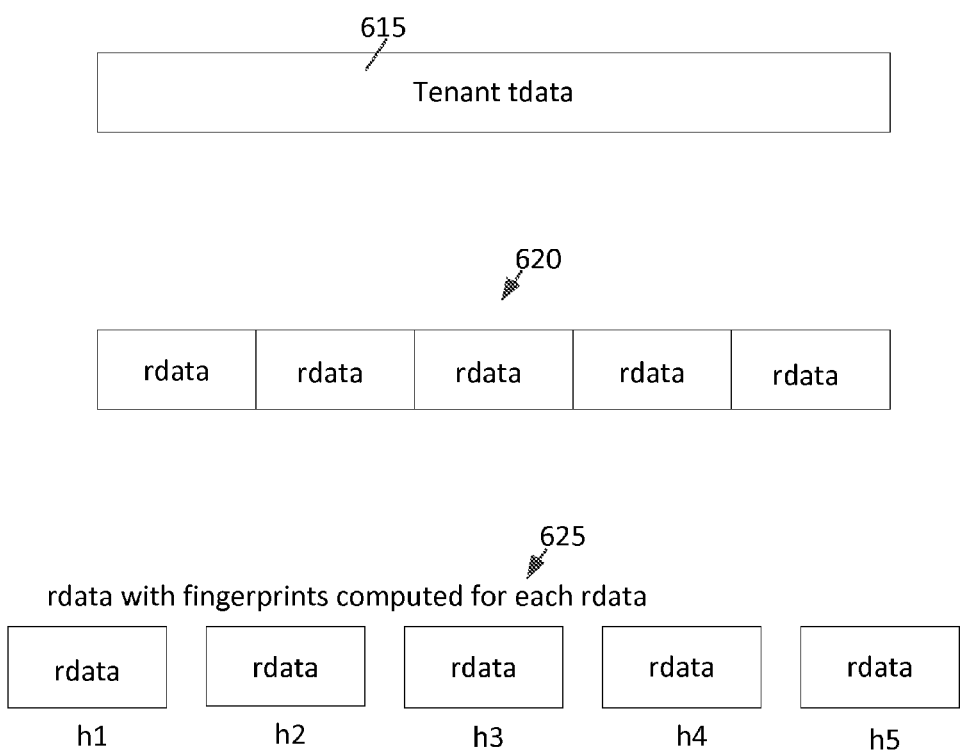
FIG. 11 illustrates an example of a tdata that is chunked and fingerprinted.

In a step 510, the first client of a first tenant applies a fingerprint algorithm to a first set of rdata objects that form a tdata item to generate a first set of rdata fingerprints. For example, FIG. 11 shows tdata 615 in several forms. The tdata 615 can be a very large file such as on the order of 100s of megabytes. Before storing it in the storage system, the tdata 615 may be chunked and broken into smaller rdata pieces 620 for uploading to the cloud storage server. Chunking helps to increase the efficiency of the upload process. In particular, if there is a failure during the transmission, the transmission can resume from the last successful chunk rather than having to restart with the very first byte of the backup image. The size of a chunk may range from about 1 byte to about 64 kilobytes (KB), but generally averages about 8 KB or 24 KB.

A set of fingerprints 625 or hashes (e.g., h1-h5) is generated for the set of rdata objects 620. The fingerprint or hash can be generated by applying the fingerprint or hash function to the unencrypted rdata objects 620. In a step 520 (FIG. 5), the first set of fingerprints and first set of rdata objects are transmitted, sent, or streamed from the client of the tenant to the cloud storage system.

In a step 525, the second tenant, different from the first tenant, applies the same or an identical fingerprint algorithm as the first customer to a second set of rdata objects (which form a second tdata) to generate a second set of rdata fingerprints. The fingerprint algorithm 480B (FIG. 4) used by the second tenant will be the same as, identical to, or a copy of fingerprint algorithm 480A used by the first tenant. In a step 530, the second set of fingerprints and encrypted second set of data objects are also transmitted to the storage system.

As illustrated, processing and storage of rdata from the first and the second tenants can be performed in parallel. In other embodiments, any number of different tenants of the multitenant system can be storing rdata on the storage server(s).

In a step 540, the rdata objects are deduplicated and encrypted at the cloud storage system. With reference to FIG. 4, in the illustrated embodiment, the cloud storage system includes a deduplication engine 440. Although the deduplication engine is shown within the cloud server, it should be appreciated that the deduplication engine can execute within an appliance separate from the server. The appliance may be a hardware appliance or software appliance (e.g., virtual appliance) that is connected to the server. The deduplication engine includes a fingerprint generator 445, a fingerprint comparison module 450, and a mapping module 455. The storage includes one or more repositories or databases that store encrypted rdata objects 470, and rdata fingerprints 475.

The fingerprint comparison module is responsible for comparing the previously stored rdata fingerprints and new fingerprints received from the tenants. The mapping module is responsible for mapping or associating a fingerprint associated with a corresponding stored encrypted rdata object. This mapping can be to a new storage location when the fingerprint does not match any existing stored fingerprints or the mapping can be to an existing encrypted rdata object storage location when there is a match between the stored rdata fingerprint and a new rdata fingerprint.

Figure 12:
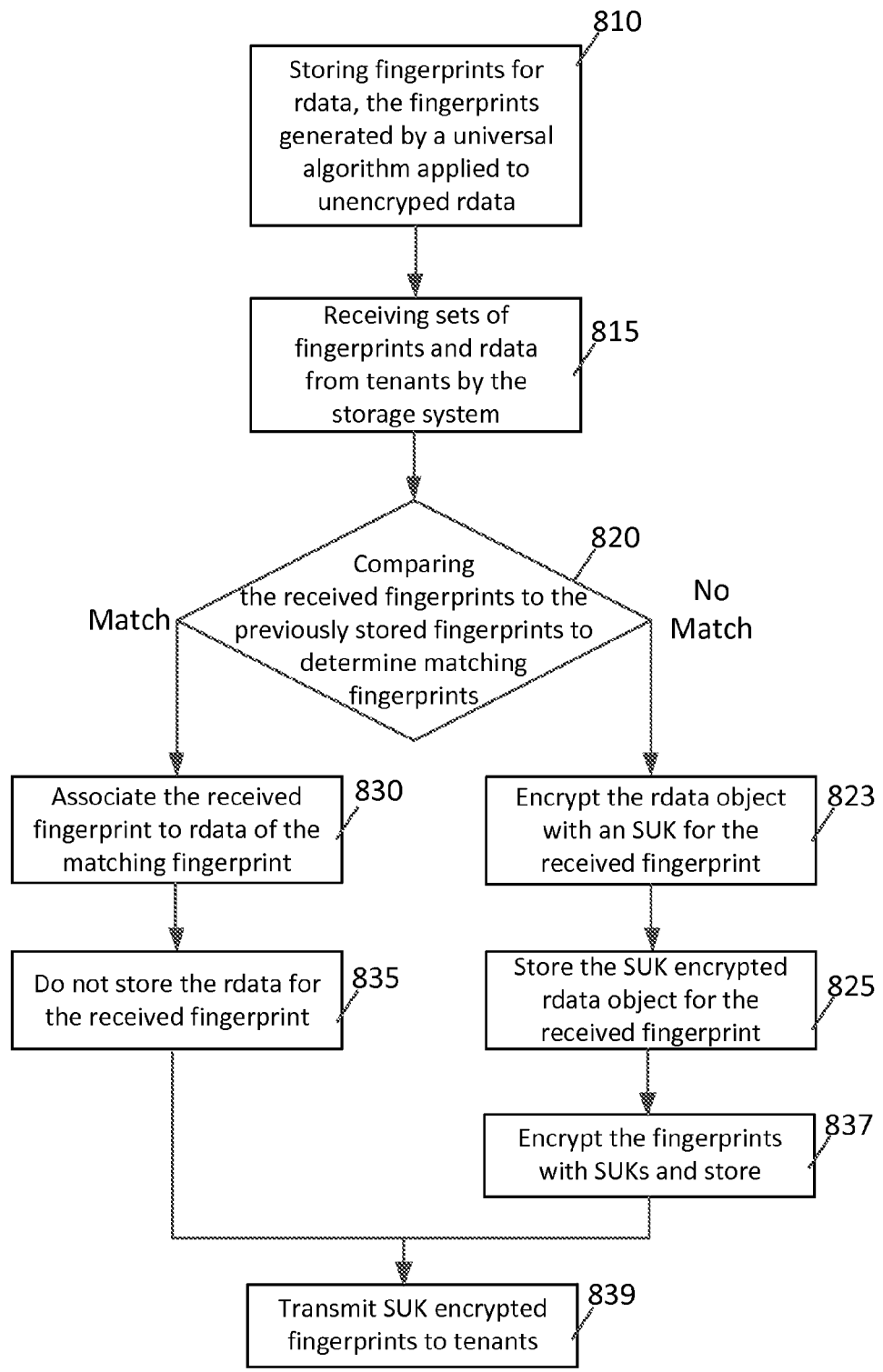
FIGS. 12 and 13 illustrate flowchart for deduplicating rdata objects in specific embodiments.

FIG. 12 shows a flowchart of a specific embodiment for deduplicating at the cloud storage system the unencrypted rdata objects. In step 810, a set of fingerprints for a set of rdata objects are stored at the storage server. The rdata fingerprints are generated by applying a system wide universal fingerprinting algorithm to unencrypted versions of the rdata objects.

In a step 815, the storage server receives from the tenants set of fingerprints and encrypted first set of rdata objects. In a step 820, the system compares the received fingerprints with the set of base fingerprints to determine whether there is a previously stored fingerprint that matches the received fingerprint.

If there is not a match, in step 825, the rdata object for the received fingerprint is encrypted with an assigned SUK in step 823 and the encrypted rdata is stored at the cloud storage server 835. In other words, the encrypted rdata object associated with the received new and unique fingerprint is retained at the cloud storage server.

In an embodiment, the storage system may also encrypt the fingerprint of the rdata with the same SUK and then store the SUK encrypted fingerprint at step 837. The SUK encrypted fingerprint can then be transmit to the tenant that transmitted the rdata to the storage system 839.

If, however, there is a match, in step 830, the received fingerprint is associated with a previously stored rdata object having a matching fingerprint. The encrypted data object for the received fingerprint can then be disregarded, purged, or not stored at the cloud storage server at step 835. That is, the new rdata object will not be saved because it is identical to a previously stored rdata object. The SUK encrypted fingerprint previously stored rdata can then be transmit to the tenant that transmitted the rdata to the storage system 839.

As discussed, the rdata fingerprints can be generated by applying a fingerprinting algorithm to unencrypted rdata objects by each of the tenants. However, in other embodiments, the fingerprints for each of the stored rdata can be generated by the storage system. In this specific embodiment, a fingerprint algorithm 480C (FIG. 4) and fingerprint generator 445 of the cloud storage system can be the same as the fingerprint algorithms 480A and 480B described above and the fingerprinting may not be performed by any of the tenants.

Figure 13:
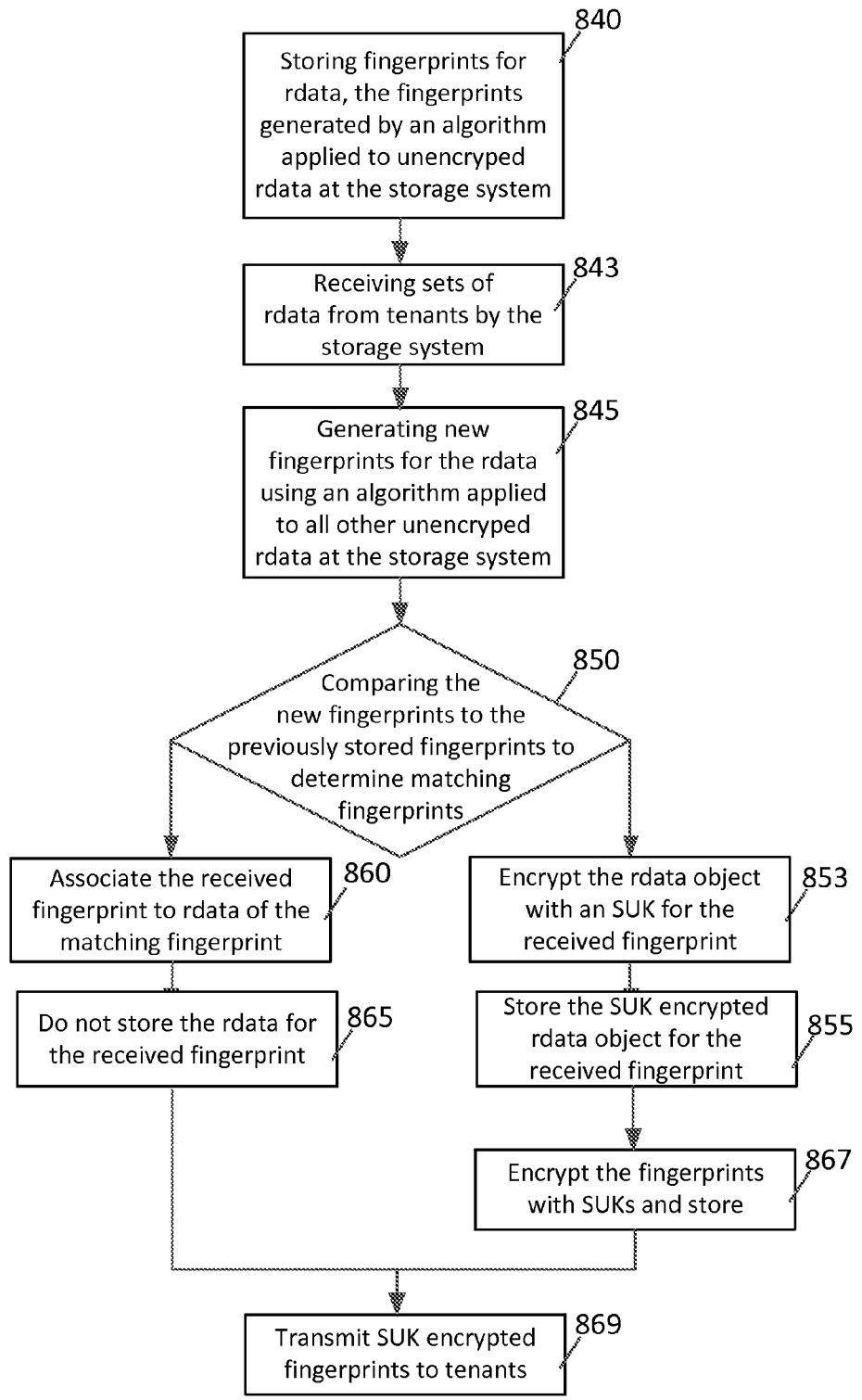

FIG. 13 shows a flowchart of another embodiment for deduplicating the unencrypted rdata objects at the cloud storage system. In a step 840, a set of fingerprints for a set of rdata objects are stored at the storage server. At step 843, the storage system receives rdata from tenants. The storage system then generates new fingerprints for the received rdata using the same algorithm applied to the previously received rdata at step 845. In step 850, the system compares the new fingerprints generated for the received rdata with the previously stored fingerprints to determine whether there is a stored fingerprint that matches a received fingerprint. If there is not a match, the rdata object for the received fingerprint is encrypted with a SUK at the storage system server at step 853 and the SUK encrypted rdata is stored at the storage system at step 855. The fingerprint can also be encrypted with the SUK and stored by the storage system at step 867. The storage system can then return the SUK encrypted fingerprints to the tenant at step 869.

If, however, there is a match, in a step 860, the received fingerprint is associated with an rdata object of the matching stored fingerprint. The rdata object for the received fingerprint can then be disregarded, purged, or not stored at the cloud storage server at step 865. The storage system can then return the SUK encrypted fingerprints for the previously store rdata to the tenant at step 869.

After the tenants receive the SUK encrypted fingerprints for the tenant's rdata that forms the tdata, each tenant can wrap the SUKs with a tenant T-Key to protect the tdata from other tenants as well as the storage system and the communications network. Each tenant can store tdata in the form of SUK encrypted and T-Key wrapped rdata fingerprints as discussed above with reference to FIG. 9.

In another specific embodiment, the fingerprints but not the rdata objects are initially sent from the client to the server for fingerprint comparison evaluation. In this specific embodiment, the comparison module at the server compares a fingerprint against the stored fingerprints. If there are no matches, the storage system server can make a request for the client tenant to send the rdata object associated with the fingerprint to the server for storage. Alternatively, if there is a match, the server associates the stored rdata object having the matching fingerprint to the client's fingerprint and can transmit back the SUK encrypted matching fingerprint. Thus, computing resources such as network bandwidth can be conserved because rdata objects may be transmitted across the network only when there are no matching stored fingerprints. In other words, in this specific embodiment, the client can send the fingerprint first and if the server responds to it by flagging the fingerprint as matching a base fingerprint, the client tenant can skip sending the rdata object altogether.

In another specific embodiment, deduplication is performed at the source client tenant. In this specific embodiment, there is a fingerprint comparison module at each tenant. The server sends the tenant the set of stored fingerprints. The tenant, using the fingerprint comparison module, compares the stored fingerprints and the fingerprints associated with the rdata objects the client tenant wishes to back up. If a stored fingerprint happens to match a stored fingerprint, an rdata object associated with the fingerprint does not have to be sent to the server. Rather, the client tenant can provide an indication to the server to associate the fingerprint to the stored data object referred to by the matching fingerprint. Alternatively, if there are no matching stored fingerprints, the client tenant's rdata object associated with the fingerprint can be sent to the server.

Factors that help determine whether to deduplicate at the client or the server include network bandwidth, network reliability, network availability, computing resources available at the server, computing resources available at the client, and others. For example, in some cases, a customer may wish to deduplicate at the source or client machine in order to avoid charges that may be incurred by using the computing resources of the cloud services provider. In other cases, a customer may wish to deduplicate at the target or server machine so that the source or client machines can be used for other computing tasks.

It should be appreciated that techniques such as compression may also be used to reduce the amount of network bandwidth required. For example, after a fingerprint of a data object has been generated, the data object may be compressed and then encrypted prior to sending the object to the server. Any appropriate compression technique may be used.

In another specific embodiment, there is a system for deduplicating, the system comprising a processor-based system executed on a computer system and configured to store in a cloud storage system of a vendor a plurality of stored fingerprints, each stored fingerprint having a corresponding stored rdata object, compare a first fingerprint associated with a first rdata object of a first tenant with the plurality of stored fingerprints, if the first fingerprint matches a stored fingerprint, associate the first fingerprint to an rdata object of the stored fingerprint, and not store the first rdata object in the cloud storage system, and if the first fingerprint does not match a stored fingerprint, store the first rdata object in the cloud storage system, wherein the first rdata object is stored in a first encrypted format and the first fingerprint is calculated before the first rdata object is encrypted.

In another specific embodiment, there is a computer program product, comprising a physical non-transitory computer-readable medium having a computer-readable program code embodied therein, the computer-readable program code adapted to be executed by one or more processors to implement a method comprising storing in a cloud storage system of a vendor a plurality of fingerprints, each fingerprint having a corresponding rdata object of a plurality of rdata objects, comparing a first fingerprint associated with a first rdata object of a first client tenant with the plurality of stored fingerprints, if the first fingerprint matches a stored fingerprint, associating the first fingerprint to a rdata object of the stored fingerprint, and not storing the first data object in the cloud storage system, and if the first fingerprint does not match the fingerprint, storing the first rdata object in the cloud storage system.

Aspects of the system can be applied in enterprise-level multi-tenant environments. In a multi-tenant environment or architecture a single instance of the software runs on a server, serving multiple customer organizations (tenants). For example, data for multiple tenants may be stored in the same physical database object, however, tenant data typically is arranged so that data of one tenant is kept logically separate from that of other tenants. Thus, one tenant does not have access to another tenant's data. A multi-tenant environment is an example where there can be different customers with redundant data across the customers. A multi-tenant environment can be a good application for embodiments of the systems and techniques described herein.

All communication (especially of the encrypted rdata objects and their respective plaintext fingerprints) between the client tenants and the cloud storage system provider can be over a secure channel as an added level of protection. Some examples of secure channels include Secure Hypertext Transfer Protocol (SHTTP), IP Security (IPSec), Point-to-Point Tunneling Protocol (PPTP), and Layer 2 Tunneling Protocol (L2TP). Instead or additionally, the fingerprints may be encrypted using a shared key (i.e., a key that is shared between the customer and cloud storage provider).

Figure 14:
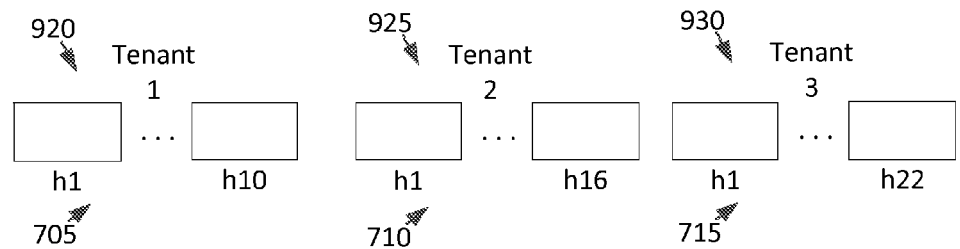
FIG. 14 illustrates an example of rdata objects before deduplication in a specific embodiment.
Figure 15:
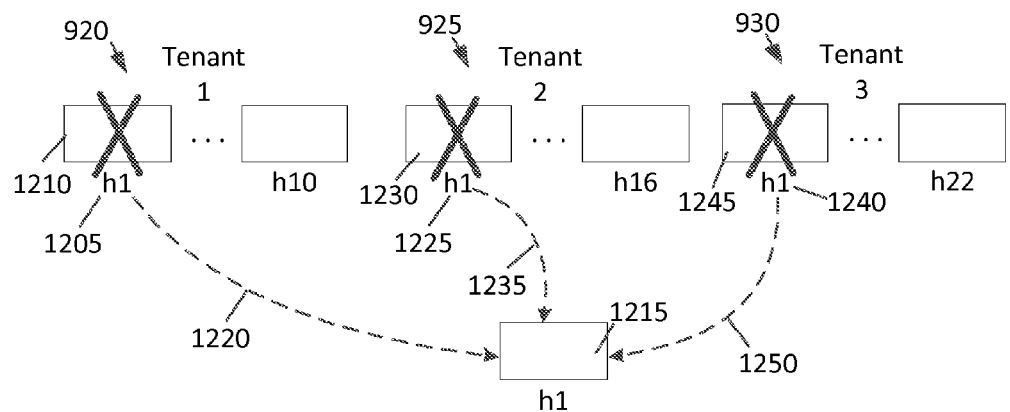
FIG. 15 illustrates an example of rdata objects after deduplication in a specific embodiment.

FIGS. 14 and 15 show further examples of the deduplication process. In FIG. 14, the first tenant has sent to the cloud server a first set of fingerprints 920 that are associated with first set of rdata objects 705. The second tenant has sent to the cloud server second set of fingerprints 925 that are associated with second set of data objects 710 and the third tenant has sent to the cloud server third set of fingerprints 930 that are associated with third set of data objects 715. The finger prints are compared to the previously stored fingerprints by a fingerprint comparison module.

FIG. 15 shows a result of the fingerprint comparison and deduplication. A fingerprint 1205 of the first set of fingerprints has been mapped (or remapped or re-associated) from an rdata object 1210 of the first set of rdata objects to a previously stored rdata object 1215 as shown by a broken line 1220. Rdata object 1210 can then be deleted or purged from storage at the cloud server as shown by the "X" superimposed over rdata object 1210 in FIG. 12.

Similarly, a fingerprint 1225 of the second set of fingerprints has been mapped from rdata object 1230 of the second set of data objects to the same rdata object 1215 as shown by a broken line 1235. Again, rdata object 1230 can then be deleted or purged from storage at the cloud server as shown by the "X" superimposed over data object 1230. A fingerprint 1240 of the third set of fingerprints has been mapped from rdata object 1245 of the third set of data objects to the same rdata object 1215 as shown by a broken line 1250. Rdata object 1245 can then be deleted or purged from storage at the cloud server as shown by the "X" superimposed over data object 1245. Thus, as shown in FIG. 15, different customers can have references, links, or pointers to the same previously saved rdata object.

Figure 16:
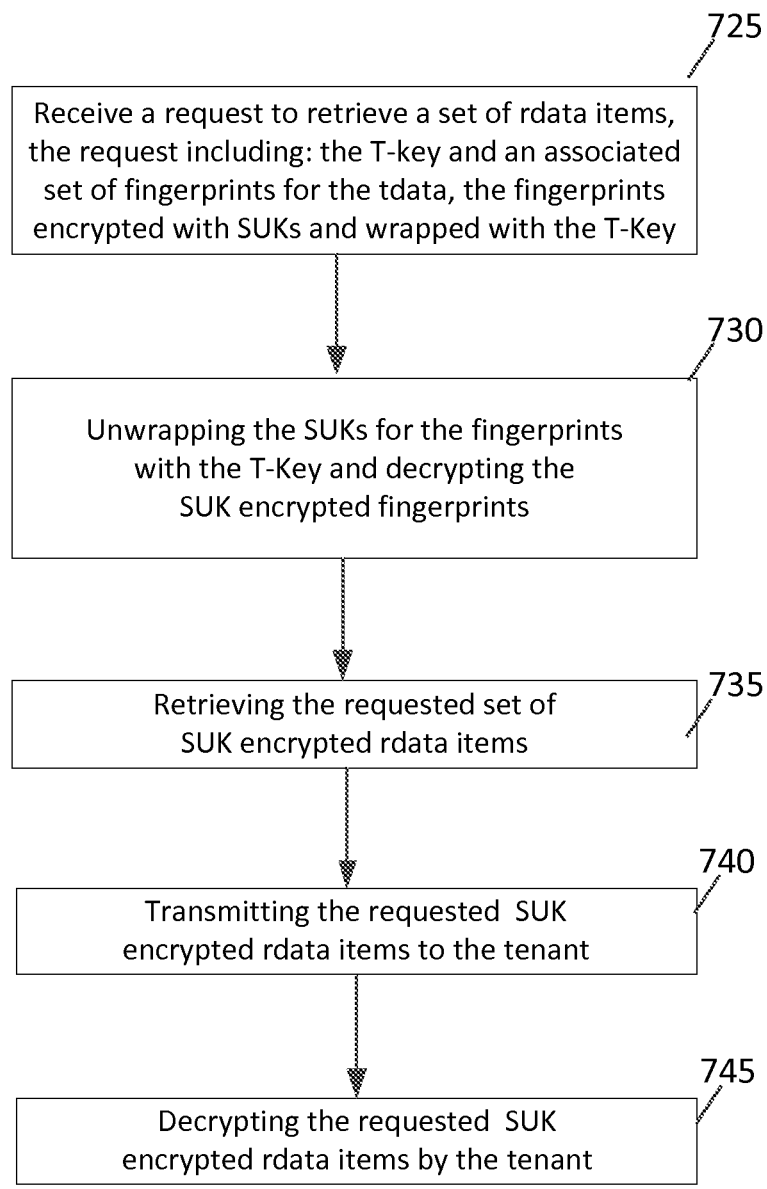
FIG. 16 illustrates a flowchart for retrieving the deduplicated encrypted data objects in a specific embodiment.

In an embodiment, when a client tenant wants to retrieve its backup objects, it passes the T-key to the storage system to retrieve the rdata corresponding tdata objects. FIG. 16 shows a flowchart for an embodiment of a method for retrieving or restoring rdata objects for a tdata object from the cloud server storage. In a step 725, a request is received by the storage system from a client tenant to retrieve an encrypted set of rdata objects that were previously sent to the cloud server for storage. The request includes a set of SUK encrypted and T-Key wrapped fingerprints associated with the requested set of rdata objects and the tenant's T-Key. In step 730, the storage system can use the T-Key to unwrap the SUKs for each of the rdata fingerprints. The storage system can then decrypt the fingerprints from the assigned SUKs. In step 735, the storage system can retrieve the requested set of SUK encrypted rdata items. At step 740, the storage system can transmit the SUK encrypted rdata objects associated with the fingerprints from the storage system to the client tenant in response to the request. At step 745, the tenant can then decrypt the rdata objects to form the requested tdata. The tenant can then use the SUKs to decrypt each of the received rdata items.

The tenants may also want to control the durations in which they trust the storage system. During the rdata request durations when the tenants do trust the storage system, the tenants provide the T-keys that allow the storage system to know the rdata sequences that form the tenants' tdata stored by the tenants. Once the storage system has returned the requested rdata, the T-key can be revoked from the storage system. When a T-Key is removed, the storage system will no longer know the rdata sequences that form the tenants' tdata and therefore the tenants' tdata is secure. This revocation can be automatic or alternatively, revocation can be requested by the tenant.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for deduplicating data on a storage system comprising:
    storing in the storage system a plurality of raw data objects;
    storing in the storage system a plurality of fingerprints, each of the plurality of fingerprints corresponding to one of the raw data object of the plurality of raw data objects;
    converting a tenant data object into a plurality of raw data objects;
    calculating, by a hardware processor, a first fingerprint for a first raw data object that is one of the plurality of raw data objects;
    comparing the first fingerprint with the plurality of fingerprints that have been stored;
    if the first fingerprint matches any of the plurality of fingerprints that have been stored, associating the first fingerprint to the raw data object of the stored fingerprint, and not storing the first data object in the storage system;

if the first fingerprint does not match the stored fingerprint, storing the first data object in the storage system, wherein the first data object is stored in a single use key encrypted format and the first fingerprint is calculated before the first data object is encrypted;

encrypting each of the plurality of fingerprints with a single use key of a plurality of single use keys by the storage system;

transmitting some of the plurality of fingerprints that have been encrypted with the single use keys to a tenant by the storage system; and wrapping the single use keys that encrypt the some of the fingerprints with a tenant key (T-key) by the tenant.

2. The method of claim 1 further comprising:
encrypting each of the raw data objects with one single use key of the plurality of single use keys.

3. The method of claim 2 wherein each of the single use keys is used to encrypt one of the raw data objects.

4. The method of claim 2 wherein each of the single use keys is used to encrypt two or more of the raw data objects.

5. The method of claim 1 further comprising:
encrypting each of the plurality of raw data objects with the single use key of the plurality of single use keys by the storage system.

6. The method of claim 1 further comprising:
wrapping each of the plurality of fingerprints encrypted with the plurality of single use keys with a storage system key by the storage system.

7. A system for deduplicating data, the system comprising:
a hardware processor in a computer system and configured to:
store in the storage system a plurality of raw data objects;
store in the storage system a plurality of fingerprints, each of the plurality of fingerprints corresponding to one of the raw data object of the plurality of raw data objects;
convert a tenant data object into a plurality of raw data objects;
calculate a first fingerprints for a first raw data object that is one of the plurality of raw data objects;
compare the first fingerprint with the plurality of fingerprints that have been stored;
if the first fingerprint matches any of the plurality of fingerprints that have been stored, associate the first fingerprint to the raw data object of the stored fingerprint, and not store the first data object in the storage system;
if the first fingerprint does not match the stored fingerprint, store the first data object in the storage system, wherein the first data object is stored in a single use key encrypted format and the first fingerprint is calculated before the first data object is encrypted;
encrypt each of the plurality of fingerprints with a single use key of a plurality of single use keys by the storage system;
transmit some of the plurality of fingerprints that have been encrypted with the single use keys to a tenant by the storage system; and
wrap the single use keys that encrypt the some of the fingerprints with a tenant key (T-key) by the tenant.

8. The system of claim 7 wherein the hardware processor is configured to:
encrypt each of the raw data objects with one single use key of the plurality of single use keys.

9. The system of claim 8 wherein each of the single use keys is used to encrypt one of the raw data objects.

10. The system of claim 8 wherein each of the single use keys is used to encrypt two or more of the raw data objects.

11. The system of claim 7 wherein the hardware processor is configured to:
encrypt each of the plurality of raw data objects with the single use key of the plurality of single use keys by the storage system.

12. The system of claim 7 wherein the processor based the hardware processor is configured to:
wrap each of the plurality of fingerprints encrypted with the plurality of single use keys with a storage system key by the storage system.

13. A computer program product, comprising a non-transitory computer-readable medium having a computer-readable program code embodied therein, the computer-readable program code adapted to be executed by one or more processors to implement a method comprising:
storing in a storage system a plurality of raw data objects;
storing in the storage system a plurality of fingerprints, each of the plurality of fingerprints corresponding to one of the raw data object of the plurality of raw data objects;
converting a tenant data object into a plurality of raw data objects;
calculating, by a hardware processor, a first fingerprint for a first raw data object that is one of the plurality of raw data objects;
comparing the first fingerprint with the plurality of fingerprints that have been stored;
if the first fingerprint matches any of the plurality of fingerprints that have been stored, associating the first fingerprint to the raw data object of the stored fingerprint, and not storing the first data object in the storage system;
if the first fingerprint does not match the stored fingerprint, storing the first data object in the storage system, wherein the first data object is stored in a single use key encrypted format and the first fingerprint is calculated before the first data object is encrypted;
encrypting each of the plurality of fingerprints with a single use key of a plurality of single use keys by the storage system;
transmitting some of the plurality of fingerprints that have been encrypted with the single use keys to a tenant by the storage system; and
wrapping the single use keys that encrypt the some of the fingerprints with a tenant key (T-key) by the tenant.

14. The method of claim 13 further comprising:
encrypting each of the raw data objects with one single use key of the plurality of single use keys.

15. The method of claim 14 wherein each of the single use keys is used to encrypt two or more of the raw data objects.

16. The method of claim 13 further comprising:
encrypting each of the plurality of raw data objects with the single use key of the plurality of single use keys by the storage system.

17. The method of claim 13 further comprising:
wrapping each of the plurality of fingerprints encrypted with the plurality of single use keys with a storage system key by the storage system.

* * * * *